United States Patent [19]

Fock et al.

[11] Patent Number: 5,087,687
[45] Date of Patent: Feb. 11, 1992

[54] POLYETHERS CONTAINING PERFLUOROALKYL GROUPS, METHODS FOR THEIR SYNTHESIS AND THEIR USE AS SURFACTANTS AND AS POLYOL COMPONENTS IN THE PREPARATION OF POLYURETHANES

[75] Inventors: Jürgen Fock, Duesseldorf; Eberhard Esselborn, Essen, both of Fed. Rep. of Germany

[73] Assignee: Th. Goldschmidt AG, Essen, Fed. Rep. of Germany

[21] Appl. No.: 470,932

[22] Filed: Jan. 26, 1990

[30] Foreign Application Priority Data

Feb. 28, 1989 [DE] Fed. Rep. of Germany ....... 3906220

[51] Int. Cl.$^5$ .................... C08L 75/04; C08G 18/38; C08G 59/30; C08G 59/42
[52] U.S. Cl. ........................... 528/50; 528/28; 528/44; 528/45; 528/401; 525/481; 524/233; 568/614; 568/615
[58] Field of Search ................ 528/28, 44, 45, 50, 528/401; 525/481; 524/233; 568/614, 615

[56] References Cited

U.S. PATENT DOCUMENTS

| | | | |
|---|---|---|---|
| 4,254,000 | 3/1981 | Ohmori et al | 528/402 |
| 4,540,765 | 9/1985 | Koemm et al. | 528/45 |
| 4,563,493 | 1/1986 | Fukui et al. | 524/233 |
| 4,816,545 | 3/1989 | Re et al. | 528/73 |
| 4,845,268 | 7/1989 | Ohsaka et al. | 568/615 |
| 4,900,872 | 2/1990 | Guglielmo et al. | 568/615 |
| 4,935,480 | 6/1990 | Zdrahala et al. | 528/28 |
| 5,012,011 | 4/1991 | Liu et al. | 568/615 |

FOREIGN PATENT DOCUMENTS

3541515 5/1988 Fed. Rep. of Germany .

OTHER PUBLICATIONS

"Tenside", 13 (1976), 1–5.
"Chemiker Zeitung", 99 (1975), 477–485.
"Chemiker Zeitung", 100 (1976), 3–14.

*Primary Examiner*—John Kight, III
*Assistant Examiner*—Dvc Truong
*Attorney, Agent, or Firm*—Toren, McGeady & Associates

[57] ABSTRACT

Polyethers are disclosed which contain perfluoroalkyl groups and have the average formula

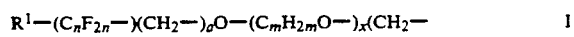

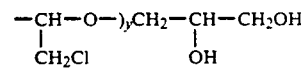

and

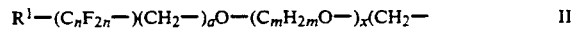

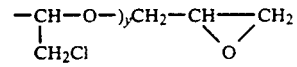

wherein
$R^1$ is the same or different in the polymer mixture and represents hydrogen or a fluoro group,
n has an average value of 4 to 12,
a has an average value of 0 to 4,
m has an average value of 2 to 18,
x has an average value of 2 to 50 and
y has an average value of 0 to 3.

A method for the synthesis of the new polyols, which are usefull as surfactants and, with respect to the compounds of formula I, as polyol components in the synthesis of polyurethanes, is also disclosed.

13 Claims, No Drawings

POLYETHERS CONTAINING PERFLUOROALKYL GROUPS, METHODS FOR THEIR SYNTHESIS AND THEIR USE AS SURFACTANTS AND AS POLYOL COMPONENTS IN THE PREPARATION OF POLYURETHANES

BACKGROUND OF THE INVENTION

This invention relates to polyethers containing perfluoroalkyl groups. More particularly, this invention concerns 1,2-polyether glycols containing perfluoroalkyl groups and the synthesis of these 1,2-polyether glycols containing perfluoroalkyl groups, their use as surfactants in the paint and lacquer industry and as polyol components in the preparation of polyurethanes from polyols and polyisocyanates.

The invention further relates to polyethers having perfluoroalkyl groups and a terminal oxiran group as an intermediate.

Aliphatic organic fluorine compounds have found much interest in industry. The compounds are used as chemical lasers, functional liquids, hydrophobizing and lyophobizing agents, antistatic agents, surfactants, for the production of extinguishing foams and for many other purposes, in which interfacial phenomena are important. The structure of suitable compounds, their synthesis and properties are summarized in "Tenside", 13 (1976), 1-5 and in "Chemiker Zeitung" 99 (1975), 477-485 and 100 (1976) 3-14.

The state of the art also includes German Patent 3.541 515. This patent concerns polyethers containing perfluoroalkyl groups which have the general formula

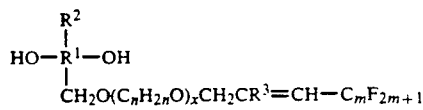

wherein
$R^1$ is an alkylene group having at most 3 carbon atoms which connects the two hydroxyl groups,
$R^2$ is hydrogen or a methyl, ethyl or phenyl group,
$R^3$ is hydrogen or a methyl group,
n is a number from 2 to 14, the value of which may vary within each molecule
m is a number from 2 to 20,
x is a number from 2 to 50.

The polyethers of aforementioned German Patent 3,541,515, which contain perfluoroalkyl groups, can be synthesized by reacting compounds of the general formula

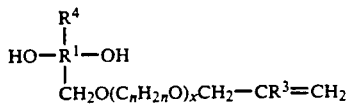

wherein
$R^1$, $R^3$, n and x have the meaning given,
$R^4$ is hydrogen or a methyl, ethyl or phenyl group, in a known manner in a solvent and in the presence of a free radical forming agent with a perfluoroalkyl iodide of the general formula $C_mF_{2m+1}I$, reacting the intermediate obtained in a known manner with alkali or alkaline earth hydroxide in at least equimolar amounts with respect to the iodine groups, freeing the product from the alkali or alkaline earth iodide formed and removing the solvent.

The aforementioned compounds are effective defoamers for aqueous, optionally pigmented, polymer dispersions. They prevent the formation of macrofoam and cause macrofoam which has already formed to collapse. At the same time, any microfoam which leads to so called pinholes in paint films is kept at a low level or suppressed.

However, when these compounds are used for certain applications, particularly when they are added to paint systems which are exposed to the elements, it turns out that they are susceptible to oxidation because of the olefinic double bonds that are present. Moreover, the compounds have an inherent yellow to yellow-brown color, which presumably is attributable to a content of ionically bound iodine. This inherent color interferes, especially when the polyetherols are to be used as reactive polyol components for the preparation of polyurethanes.

SUMMARY OF THE INVENTION

It is an object of the invention to provide polyethers which contain perfluoroalkyl groups and do not have the disadvantages mentioned above.

Other objects of the invention are to provide effective surfactants and, when used for the preparation of polyurethanes, to endow these with properties which are particularly desirable for industrial applications.

These objectives and other are accomplished by new polyethers of the invention, which contain perfluoroalkyl groups and have the average formula I

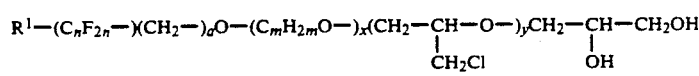

wherein
$R^1$ is the same or different in the polymer mixture and represents hydrogen or a fluoro group,
n has an average value of 4 to 12,
a has an average value of 0 to 4,
m has an average value of 2 to 18,
x has an average value of 2 to 50 and
y has an average value of 0 to 3.

Compounds of formula II of the invention

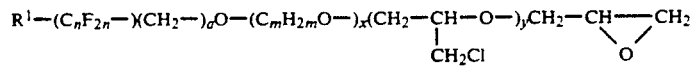

are intermediates in the preparation of compounds of formula I and are causally responsible for their properties. The causality arises from the presence of the perfluoroalkyl and polyoxyalkylene groups in the polymer molecule.

The compounds of formulas I and II are polymers which are present in the form of a mixture. The formulas therefore indicate the average composition, the individual molecules in the mixture differing particularly in the values of the subscripts n, m, x and y. Moreover, the $R^1$ group may be different in the polymer mixture and represents a hydrogen or a fluorine group.

The subscript n indicates the number of carbon atoms in the perfluoroalkyl group and has an average value of 4 to 12. Preferably, the average value of n is 6 to 10.

The subscript a has an average value of 0 to 3, an average value of 2 being preferred.

The subscript m indicates the number of carbon atoms in the oxyalkylene group and has an average value of 2 to 18 and preferably of 2 to 4. If the compounds of formula I are to be used particularly on the basis of their surfactant character, then m preferably has an average value of 2 to 3. Particularly preferred oxyalkylene groups are oxyethylene, oxypropylene and oxybutylene groups. An average value of 2.5 may, for example be obtained for m by having equal amounts of oxyethylene and oxypropylene groups present side by side in the average molecule.

If the compounds of formula I are to be used as polyol components for the preparation of polyurethanes, a value of 3 to 4 is preferred for m. In the trade, however, longer chain α-olefin epoxides with up to 18 carbon atoms are also known. By a suitable selection of the alkylene oxides, it is possible to affect and control the hydrophilic-lipophilic balance (HLB) of the compounds.

The subscript x indicates the number of oxyalkylene units present and has an average value of 2 to 50.

The subscript y indicates the number of chloromethyloxyethylene groups and has an average value of 0 to 3.

The $R^1$ group and the aforementioned subscripts have the same meanings in formula II.

In a particular aspect of the invention, the inventive compounds can be synthesized by a) adding x moles of alkylene oxide of the general formula

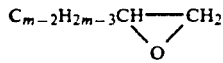

and/or tetrahydrofuran to an alcohol of the general formula $R^1(C_nH_{2n}-)(CH_2-)_aOH$ in the presence of a cationic catalyst at a temperature of 0° C. to 100° C.;

b) adding y +1 moles of epichlorohydrin to the polyetherol obtained in the presence of a cationic catalyst at a temperature of 0° C. to 100° C.;

c) converting the chlorohydrin obtained with a slight excess of alkali hydroxide or alkali alcoholate at a temperature of 0° C. to 40° C. into the corresponding oxiranyl component of formula II and d) converting these compounds with a mineral acid, preferably in the presence of an aliphatic alcohol and a phase transfer catalyst, into compound of formula I, wherein the subscripts n, m, a and y and the $R^1$ group have the meanings already given.

After step c) of the method, the intermediate of formula II is present. The end product of formula I is obtained when step c) of the method is followed by step d).

In step a) of the method, x moles of alkylene oxide of the general, average formula

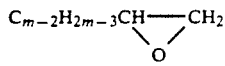

and/or tetrahydrofuran are added to the alcohol of the general, average formula $R^1(C_nH_{2n}-)(CH_2-)_aOH$ in the presence of a cationic catalyst at a temperature of 0° C. to 100° C. This addition reaction is catalyzed cationically. Lewis acids are preferably used as the addition reaction catalyst. Example of such Lewis acids are zinc tetrachloride, boron trifluoride and boron trifluoride etherate.

The addition reaction takes place at temperatures ranging from 0° C. to 100° C. and particularly from 40° C. to 70° C.

The addition reaction between y +1 moles of epichlorohydrin and a polyetherol obtained in step b) of the method also takes place in the presence of a cationic catalyst at temperatures ranging from 0° C. to 100° C. The same catalysts can be used for the two steps of the method and the same temperature ranges are preferred.

In step c) of the method, the chlorohydrin obtained is converted into the corresponding oxiranyl compounds of formula II. This ring closure is accomplished in a known manner with a slight excess of alkali hydroxide or alkali alcoholate, preferably sodium methylate, at a temperature of 0° C. to 40° C. and preferably 20° C. to 30° C.

Compounds of formula I of the invention are now obtained in subsequent step d) from the intermediate of formula II of step c) of the method, by allowing a mineral acid to act on the intermediate product of step c), preferably in the presence of an aliphatic alcohol and a phase transfer catalyst. As the mineral acid, particularly a dilute aqueous mineral acid, preferably about a 0.5% to 2% by weight sulfuric acid solution, is used. Lower aliphatic tertiary alcohols with up to 8 carbon atoms are particularly suitable aliphatic alcohols. As phase transfer catalysts, preferably surface active, quaternary ammonium compounds, such as tetraalkylammonium sulfates or halides, are used.

The inventive compounds of formula I are largely colorless products and, in contrast to the products of the German Patent 3,541,515, free of double bonds and color producing impurities. They have excellent surfactant properties. This is shown by the greatly reduced surface tension of dilute aqueous solutions thereof.

A further object of the present invention is the use of the compounds of formula I as surfactants in the paint and lacquer industry, particularly as defoamers for aqueous, optionally pigmented, polymer dispersions. On the basis of their surface active properties, the inventive compounds can also be used as surfactants in the textile industry and for the preparation of floor and paint preservatives, such as wax emulsions. The equalizing capabilities of the compounds, in particular, are utilized here.

A further object of the invention is the use of the compounds of formula I as polyol components in the preparation of polyurethanes. The compounds of formula I can be used as the sole polyol component or in admixture With other polyols. In general, the compounds are used in admixture with other polyol components, in which they are present preferably in amounts of 0.1% to 20%, based on the polyol, to modify the properties of polyurethanes.

Through the use of the inventive compounds of formula I in admixture with other polyol components, polyurethanes of low surface energy are obtained, with hydrophobic and lyoophobic properties. They are, moreover, suitable, for letting the surfaces of polyurethanes become tack free and even adhesive.

The compounds of formula II are not only used as intermediates for the preparation of the inventive products of formula I, but can themselves also be used, for example, to modify epoxide resins. The effects that they produce there are similar to those brought about by the inventive compounds of formula I in polyurethanes.

The preparation of the inventive compounds is described in greater detail in the following examples. In addition, the application properties of the inventive compounds are shown, using the lowering of the surface tension of aqueous solutions and the defoaming of aqueous polymer dispersions as examples. Finally, the use of the inventive compounds to modify polyurethanes is described in greater detail.

The following illustrative examples, which demonstrate the best mode currently contemplated for carrying out the invention, must not be construed as limiting the invention in any manner.

EXAMPLE 1

A1) Synthesis of an alpha-Hydroxy-omega-perfluoroalkanol Polyalkylene Oxide (not of the invention)

Perfluorooctylethanol (465 q, ca. 1 mole) and 25 g of tin tetrachloride are heated in a pressure vessel under pure nitrogen to 60° C, after which 439 g of propylene oxide (ca. 7.6 moles) are added over a period of 3 hours. The reaction is allowed to continue for a further 0.5 hours, after which the pressure vessel is cooled. The epoxide number of 0.01, determined on a sample of the product, indicates that the reaction has gone largely to completion. The product is neutralized with 25% by volume aqueous ammonia. Water and by-products are distilled off at 100° C. and 10 torr and the product finally is filtered in the presence of a filter aid.

The hydroxyl number, determined by wet chemistry, is 63. Assuming a functionality of 1, this hydroxyl number corresponds to a molecular weight of about 890.

A2) Preparation of an alpha-Oxiranyl-omega Perfluoroalkylalkanol Polyalkylene Oxide (Inventive Intermediate)

The product obtained in A1) (890 g, 1 mole), is mixed with 3 g of boron trifluoride etherate, dissolved in a 10.5% solution in diethyl ether, and the mixture obtained is heated under nitrogen to 60° C. To this mixture are added 231 g (ca. 2.5 moles) of epichlorohydrin at such a rate, that the internal temperature does not exceed 65° C. At the end of the addition, the heating is continued for a further hour at 60° C. Subsequently, 56.7 g (ca. 1.05 moles) of sodium methylate, dissolved in 132 g of methanol, are added at a temperature of about 25° C. at a rate at which the temperature does not exceed of 30° C. The reaction is concluded when two alkali numbers, determined at an interval of ½ hour, are ca. the same and lie below 1.

After removal of the volatile components by distillation at 80° C. and 10 torr, the precipitated sodium chloride is filtered off. The epoxide number of the product obtained in % by weight of oxygen is 1.5.

A3) Preparation of an omega-Perfluoroalkylethyl Polyalkylene Oxide 1,2-Diol (of the invention)

The product of Example 1 A2) (500 g, ca. 0.45 moles) is dissolved in 500 g of t-butanol and 250 g of a 1% aqueous solution of sulfuric acid and 5 g of tetrabutylammonium hydrogen sulfate are added to this solution. The mixture obtained is heated to 50° C. and held for 8 hours at this temperature. Subsequently, the mixture is neutralized with 10% aqueous sodium hydroxide solution. After the addition of 8 g of a 30% solution of hydrogen peroxide in water, the water and other volatile components are distilled off at 80° C. and 10 torr and the product is filtered.

A product with a slightly yellow tinge and a Gardner number of 2 is obtained. The epoxide number is 0 now and the hydroxyl number is 103. Gel chromatographic analysis reveals that the number average molecular weight is 1,000.

EXAMPLES 2 to 18

Preparation of various omega-Perfluoroalkylethyl Polyalkylene Oxide 1,2-Diols The method of Example 1 is followed, with the difference that various alkylene oxides and perfluoroalkylethanols are used in different molar amounts or molar ratios. The nature and molar amounts of the alkylene oxides or their mixtures and the number of the carbon atoms in the starter molecule are given in Table 1. In this connection, the number of the fluorine in the starter molecules with 4, 6, 8 and 12 carbon atoms can be calculated from the formula $C_mF_{2m+1}$—$CH_2$—$CH_2$—OH, while $HC_{10}F_{20}CH_2$—$CH_2$—OH is used for the corresponding compound with 10 carbon atoms. Moreover, the molecular weight of the alpha-hydroxy-omega-perfluoroalkanol polyether $MW_{OH\ No.}{}^1$), determined from the hydroxyl number, the epoxide number of the alpha-oxiranyl-omega-perfluoroalkylalkanol polyalkylene oxide in percent by weight of oxygen, based on the molecular weight of the product reacted with epichlorohydrin and sodium methylate, and the molecular weight of the omega-perfluoroalkylalkanol polyalkylene oxide 1,2-diol $MW_{OH\ No.}{}^2$), are given in Table 1. Finally, the number average molecular weight $\overline{M}_n$ of the diol, determined by gel chromatographic analysis (GPC), and the percentage of fluorine in the end product ar given in Table 1.

TABLE 1

| Example No. | Alkylene Type | Oxide Moles | Perfluoroalkyl Alkanol No. of C Atoms | $MW_{OH\ No.}{}^1$ | Epoxide Number % by wt. O | $MW_{OH}{}^2$ | $\overline{M}_{nGPC}$ | Fluorine Content % by wt. F |
|---|---|---|---|---|---|---|---|---|
| 2 | PO | 2.9 | 6 | 515 | 2.2 | 728 | 700 | 33.9 |
| 3 | PO | 5.3 | 6 | 650 | 1.9 | 850 | 780 | 29.0 |
| 4 | PO | 13.4 | 6 | 1100 | 1.2 | 1300 | 1250 | 18.8 |
| 5 | PO | 7.6 | 8 | 850 | 1.5 | 1050 | 990 | 30.8 |
| 6 | PO | 13.9 | 12 | 1410 | 1.0 | 1620 | 1540 | 28.7 |

TABLE 1-continued

| Example No. | Alkylene Type | Oxide Moles | Perfluoroalkyl Alkanol No. of C Atoms | $MW_{OH\ No.}^{1}$ | Epoxide Number % by wt. O | $MW_{OH}^{2}$ | $\overline{M}_{nGPC}$ | Fluorine Content % by wt. F |
|---|---|---|---|---|---|---|---|---|
| 7 | PO/BO | 8.9/8.9 | 6 | 1440 | 1.0 | 1660 | 1580 | 14.8 |
| 8 | BO | 10.0 | 8 | 1120 | 1.2 | 1340 | 1260 | 24.0 |
| 9 | BO | 10.5 | 10 | 1250 | 1.1 | 1430 | 1400 | 26.1 |
| 10 | BO/DDO | 5.3/1.8 | 4 | 930 | 1.4 | 1150 | 1110 | 15.4 |
| 11 | BO/TDO | 4/1 | 6 | 820 | 1.5 | 1010 | 960 | 24.1 |
| 12 | EO | 2.9 | 6 | 470 | 2.5 | 680 | 620 | 36.9 |
| 13 | EO | 7.6 | 6 | 670 | 1.8 | 880 | 800 | 28.0 |
| 14 | EO | 16.7 | 6 | 920 | 1.3 | 1150 | 1100 | 21.5 |
| 15 | EO | 7.6 | 4 | 580 | 2.0 | 800 | 700 | 21.8 |
| 16 | EO/PO | 6.0/1.5 | 8 | 770 | 1.7 | 980 | 900 | 33.2 |

Key for Table 1:
EO = ethylene oxide
PO = propylene oxide
BO = n-butylene oxide
DDO = n-dodecene oxide
TDO = n-tetradecene oxide

Test to Check the Defoaming Capability

In a beaker with a diameter of 6 cm, 100 g of a 45% aqueous dispersion of a copolymer based on styrene and an acrylate ester (obtainable in the trade under the name of Acronal ® 170 D) are stirred in the presence of an inventive compound with a turbine stirrer with a diameter of 4 cm for 1 minute at 2500 rpm, corresponding to a circumferential speed of 5.2 m/sec.

Immediately after the stirrer is turned off, the dispersion, so treated, is filled up to the mark into a 50 ml measuring flask and weighed. The density of the contents of the flask depends on the amount of air stirred in and represents a measure of the effectiveness of the defoamer.

Table 2 shows the amount of inventive compounds or of the comparison compounds, which are not of the invention, in percent by weight, based on the weight of the dispersion used, which has not been stirred, and the volume of air stirred in per 100 cc of stirred dispersion immediately after the stirring. If no defoamer is used, 55.4 cc of air are stirred into 100 cc of stirred dispersion.

TABLE 2

| Substance of Example | Air Volume (cc) at a Concentration (Percent Weight) Of | | |
|---|---|---|---|
| | 0.2 | 0.1 | 0.02 |
| 1 | 3.3 | 6.9 | 12.4 |
| 2 | 2.4 | 6.7 | 9.2 |
| 3 | 3.7 | 6.9 | 11.5 |
| 4 | 3.5 | 8.9 | 13.0 |
| 5 | 2.6 | 5.5 | 8.8 |
| 6 | 2.1 | 4.3 | 7.3 |
| 7 | 2.2 | 4.6 | 7.5 |
| 8 | 2.0 | 4.2 | 7.2 |
| 9 | 1.9 | 4.0 | 7.0 |
| 10 | 2.0 | 4.3 | 7.1 |
| 11 | 3.1 | 4.9 | 9.3 |
| Comparison Product | | | |
| A | 5.8 | 9.7 | 18.8 |
| B | 21.4 | — | — |
| C | 28.2 | — | — |
| D | 18.4 | — | — |

TABLE 2-continued

| Substance of Example | Air Volume (cc) at a Concentration (Percent Weight) Of | | |
|---|---|---|---|
| | 0.2 | 0.1 | 0.02 |
| E | 16.5 | — | — |

Comparison Product A is a mixture of polyoxypropylene-polysiloxane block copolymer and highly disperse silica of German Patent 2,443,853.
Comparison Product B is a mixture of mineral oil, silicone and emulsifier, obtainable in the trade as Nopco 8034.
Comparison Product C is a mixture of fatty esters, paraffin and silicone, obtainable in the trade as Bevaloid I 142.
Comparison Product D is a mixture of mineral oil, fatty esters and metal soaps, obtainable in the trade as Byk 073.
Comparison Product E is a mixture of mineral oil, alcohols, emulsifiers and metal soaps, obtainable in the trade as Dehydran A.

Determination of the Lowering of Surface Tension

The surface tension of water containing inventive or comparison substances is determined by the method of DIN 53 914. For this purpose, a 1% by weight solution of the substance to be tested in doubly distilled water is prepared. A thermostatable glass vessel with a diameter of 10 cm is used for the test. The force K is measured, which is required to pull a ring of radius R, which is suspended parallel to the liquid surface, out of the liquid surface:

$$\delta = \frac{K}{4\pi R}$$

The values given in Table 3 show the surface tension of the inventive compounds, as well as of compounds not of the invention of formula $$C_mF_{2m+1}-(CH_2)_3-(C_2H_4O)_x-H \qquad A.$$

TABLE 3

| Substance of Example | Surface Tension (mNm$^{-1}$) at a Concentration (percent by Weight) of | | |
|---|---|---|---|
| | 1 | 0.1 | 0.01 |
| 12 | | | |
| 13 | — | 21 | 24 |
| 14 | 19 | 21 | 23 |
| 15 | 22 | 24 | 31 |
| 16 | 22 | 23 | 27 |
| | 18 | 21 | 22 |
| Average Comparison Substance of Formula A | 21 | 22.8 | 26.5 |

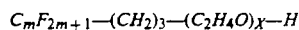
m     x

TABLE 3-continued

| Substance of Example | | Surface Tension (mNm$^{-1}$) at a Concentration (percent by Weight) of | | |
|---|---|---|---|---|
| | | 1 | 0.1 | 0.01 |
| 6 | 5 | — | 26 | 32 |
| 6 | 13 | 23 | 25 | 32 |
| 6 | 21 | 27 | 28 | 38 |
| 6 | 45 | 27 | 32 | 45 |
| 7 | 4 | — | 28 | 32 |
| 7 | 14 | 24 | 25 | 30 |
| 8 | 8 | 23 | 26 | 34 |
| Average | | 24.8 | 27.1 | 34.7 |

Determination of the Surface Tension of a Wax Preparation

Compounds of the invention are added to a wax emulsion as equalizing agents and their effect is compared with that of compounds of formula A.

The lower the surface tension, the better is the equalizing capability of the additives and the less is the edge formation that occurs after drying.

For preparing a wax emulsion, 5 parts by weight of an emulsifier free mining wax with a dropping point of 83° C. to 89° C., an acid number of 85 to 95, a saponification number of 87 to 104, 1 part by weight of diethanolamine and 27 parts by weight of water are used.

The surface tension values, upon addition of 0.05% by weight of the compounds to be tested to the wax emulsion, are given in Table 4.

TABLE 4

| Substance of Example | Surface tension (mNm$^{-1}$) upon Addition of 0.05% of Substance |
|---|---|
| 12 | 33 |
| 13 | 31 |
| 14 | 32 |
| 15 | 32 |
| 16 | 31 |
| Average | 32 |
| Comparision Substance of Formula A | |
| m x | |
| 6  5 | 35 |
| 6  13 | 36 |
| 6  21 | 37 |
| 6  45 | 39 |
| 7  4 | 34 |
| 7  14 | 37 |
| 8  8 | 33 |
| Average | 36 |

Preparation of a Polyurethane Dispersion

A mixture of 118.5 g (ca. 0.06 moles) of a conventional, commercial polyester diol from adipic acid, 1,6-hexanediol and neopentyl glycol having a hydroxyl number of 56.8, 11.2 g (ca. 0.01 moles) of a compound of formula

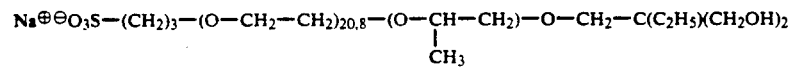

and 13.4 g (ca. 0.01 moles) of the inventive substance of Example 8 is freed at 120° C. and 10 torr from any water that may be present and then treated at 85° C. with 24.5 g (ca. 0.11 moles) of isophorone diisocyanate. The reaction is ended when a constant isocyanate content of 1.51% by weight is attained. After dilution of the resulting polymer with 110 g of anhydrous acetone, a solution of 1.5 g (ca. 0.025 moles) of ethylenediamine in 50 g of anhydrous acetone is slowly added dropwise at 60° C. This temperature is maintained until the isocyanate content has dropped to below 0.2% by weight. After cooling to 30° C., 168.6 g of deionized water are added slowly with high-shear stirring, whereby a polyurethane dispersion is formed. After removal of the acetone by vacuum distillation, a finely particulate, stable dispersion with a solids content of ca. 50% by weight is obtained.

The dispersion is cast on a glass plate with the help of a doctor blade. Upon evaporation of the water, a clear, colorless, elastic, tack free film is formed.

A film, which is prepared in a comparison experiment without the Use of the substance from Example 8, admittedly is also clear, colorless and elastic. However, it has a certain tackiness.

A film, which is produced in a comparison experiment using an omega-perfluorohexylpropyl-polybutyleneoxide-n-dodeceneoxide-1,3-diol (corresponding to Example 11 of the German Patent 3,541,515), admittedly is clear, elastic and tack free. However, it has a distinct yellowish tinge.

Preparation of a Cross-Linked Polyurethane Film

A mixture of 30 g (ca. 0.02 moles) of the inventive substance from Example 8 and 1721 g (ca. 3 moles) of trimerized hexamethylene diisocyanate in 570 g of a mixture of ethylene glycol acetate and toluene in a weight ratio of 1 : 1 is heated under nitrogen and with the exclusion of water for 2 hours at 50° C. After cooling to 25° C., 1250 g (ca. 3 moles) of a propoxylated trimethylolpropane With a molecular weight of 420 and 3.5 g of tin dibutyl dilaurate are stirred for 10 minutes at 50 torr and a constant temperature of 25° C. The mixture obtained is cast on a glass plate with the help of a doctor blade. Drying takes place for 2 hours at room temperature. After that, the film obtained, which has a thickness of about 100 microns is heated for 30 minutes at 80° C. and finally for 15 hours at 60° C.

The film is clear, colorless and softly elastic. The contact angles used to determine the surface energy have a value of 100° when water is used and a value of 45° C. when n-dodecane is used at 25° C.

In the comparison experiment a film is prepared in the manner described without the use of the inventive substance. With this film, a contact angle of 55° C. is obtained with water and of 15° C. with n-dodecane.

In a further comparison experiment, a film is prepared using an omega-perfluorohexylpropyl-polybutyleneoxide-n-dodeceneoxide-1,3-diol (corresponding to Example 11 of the German Patent 3,541,515). The film has a distinctly yellowish shade.

We claim:
1. Polyether containing perfluoroalkyl groups and having the average formula

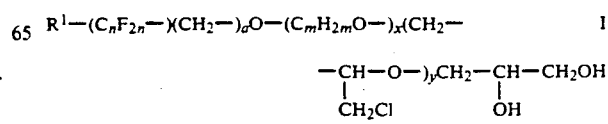

-continued or $$R^1-(C_nF_{2n}-)(CH_2-)_aO-(C_mH_{2m}O-)_x(CH_2-$$  II $$-CH-O-)_yCH_2-CH\underset{O}{\overset{}{\diagdown\!\!\diagup}}CH_2$$
$$\phantom{-CH-O-)_y}|$$
$$\phantom{-CH-O-)_y}CH_2Cl$$

wherein

R$^1$ is the same or different in the polymer mixture and represents hydrogen or a fluoro group, n has an average value of 4 to 12, a has an average value of 0 to 4, m has an average value of 2 to 18 x has an average value of 2 to 50 and y has an average value of 0 to 3.

2. The polyether according to claim 1, which has the formula $$R^1-(C_nF_{2n}-)(CH_2-)_aO-(C_mH_{2m}O-)_x(CH_2-CH-O-)_yCH_2-CH-CH_2OH.\quad I$$
$$\phantom{R^1-(C_nF_{2n}-)(CH_2-)_aO-(C_mH_{2m}O-)_x(CH_2-}|\phantom{)_yCH_2-CH}|$$
$$\phantom{R^1-(C_nF_{2n}-)(CH_2-)_aO-(C_mH_{2m}O-)_x(CH_2-}CH_2Cl\phantom{)_yCH_2-CH}OH$$

3. The polyether according to claim 1, which has the formula $$R^1-(C_nF_{2n}-)(CH_2-)_aO-(C_mH_{2m}O-)_x(CH_2-CH-O-)_yCH_2-CH\underset{O}{\overset{}{\diagdown\!\!\diagup}}CH_2.\quad II$$
$$\phantom{R^1-(C_nF_{2n}-)(CH_2-)_aO-(C_mH_{2m}O-)_x(CH_2-}|$$
$$\phantom{R^1-(C_nF_{2n}-)(CH_2-)_aO-(C_mH_{2m}O-)_x(CH_2-}CH_2Cl$$

4. The polyether according to claim 1, wherein

R$^1$ is the same or different in the polymer mixture and represents hydrogen or a fluoro group.

n has an average value of 6 to 10, a has an average value of 0 to 3, m has an average value of 2 to 4, x has an average value of 2 to 50 and y has an average value of 0 to 3.

5. A surfactant useful for paint and lacquer comprising a compound defined in claim 2.

6. A defoaming agent useful for defoaming aqueous, optionally pigmented, polymer dispersions comprising a compound defined in claim 2.

7. A polyol component for the preparation of polyurethanes comprising a compound of claim 2.

8. A method of preparing a polyurethane, wherein a polyol is reacted with a polyisocyanate, comprising using a compound of claim 2 as a polyol component.

9. A method of preparing a polyether containing perfluoro groups and having the average formula $$R^1-(C_nF_{2n}-)(CH_2-)_aO-(C_mH_{2m}O-)_x(CH_2-\quad I$$

$$-CH-O-)_yCH_2-CH-CH_2OH$$
$$\phantom{-CH-O-)_y}|\phantom{CH_2-CH}|$$
$$\phantom{-CH-O-)_y}CH_2Cl\phantom{CH_2-CH}OH$$

or $$R^1-(C_nF_{2n}-)(CH_2-)_aO-(C_mH_{2m}O-)_x(CH_2-\quad II$$

$$-CH-O-)_yCH_2-CH\underset{O}{\overset{}{\diagdown\!\!\diagup}}CH_2$$
$$\phantom{-CH-O-)_y}|$$
$$\phantom{-CH-O-)_y}CH_2Cl$$

wherein

R$^1$ is the same or different in the polymer mixture and represents hydrogen or a fluoro group, n has an average value of 4 to 12, a has an average value of 0 to 4, m has an average value of 2 to 18, x has an average value of 2 to 50 and y has an average value of 0 to 3. comprising a) adding x moles of a compound selected from tetrahydrofuran, alkylene oxide of the formula $$C_{m-2}H_{2m-3}CH\underset{O}{\overset{}{\diagdown\!\!\diagup}}CH_2$$

or a combination thereof to an alcohol of the formula R$^1$(C$_n$H$_{2m}$)(CH$_2$—)$_a$OH in the presence of a cationic catalyst at a temperature of about 0° C. to 100° C. to obtain a polyetherol, b) adding y+1 moles of epichlorohydrin to the polyetherol in the presence of a cationic catalyst at a temperature of about 0° C. to 100° C. to obtain a chlorohydrin, c) converting the chlorohydrin with alkali hydroxide or alkali alcoholate at a temperature of about 0° C. to 40° C. into the corresponding oxiranyl compound of formula II and d) optionally converting with a mineral acid into a compound of formula I.

10. The method of preparing a polyether according to claim 9, wherein the oxiranyl compound of formula II is converted into compound of formula I with a mineral acid in the presence of an aliphatic alcohol and a phase transfer catalyst.

11. The method of preparing a polyether according to claim 9, wherein steps a) and b) are carried out in the presence of a Lewis acid as the catalyst and at a temperature of 40° C. to 70° C.

12. The method of preparing a polyether according to claim 9, wherein in step c) the chlorohydrin is converted with sodium methylate at a temperature of 20° C. to 30° C.

13. The method of preparing a polyether according to claim 9, wherein in step d) the oxiranyl compound of formula II is converted into a compound of formula I by means of a 1% by weight aqueous sulfuric acid solution in the presence of a lower aliphatic tertiary alcohol and a catalyst selected from tetraalkylammonium sulfate and tetraalkylammonium halide.

* * * * *